Figure 1:
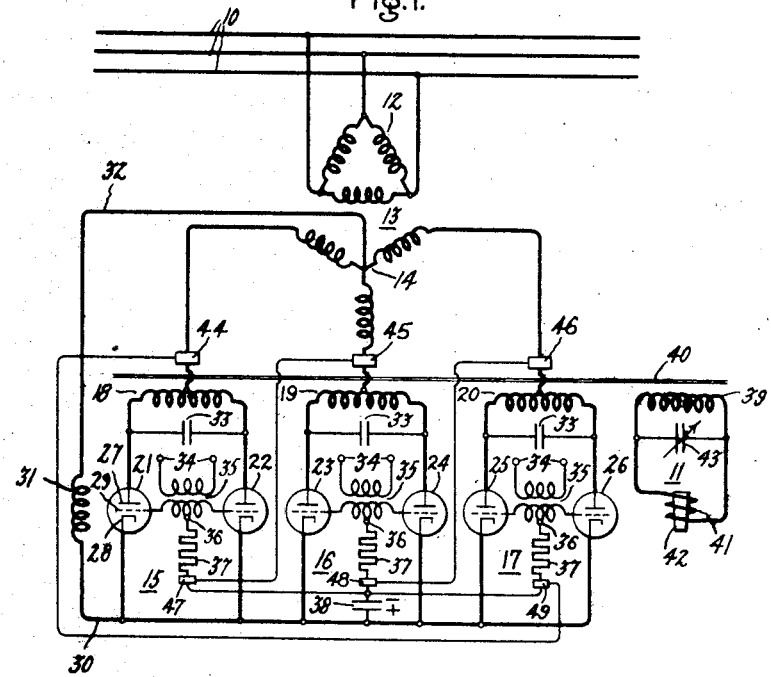

Oct. 22, 1940.    H. O. SCHMIDT    2,219,200
ELECTRIC VALVE CONVERTING SYSTEM
Filed June 7, 1939    4 Sheets-Sheet 1

Inventor:
Hellmuth O. Schmidt,
by Harry E. Dunham
His Attorney.

Oct. 22, 1940.   H. O. SCHMIDT   2,219,200
ELECTRIC VALVE CONVERTING SYSTEM
Filed June 7, 1939  4 Sheets-Sheet 2

Inventor:
Helmuth O. Schmidt,
by Harry E. Dunham
His Attorney.

Oct. 22, 1940. H. O. SCHMIDT 2,219,200
ELECTRIC VALVE CONVERTING SYSTEM
Filed June 7, 1939 4 Sheets-Sheet 3

Inventor:
Hellmuth O. Schmidt,
by Harry E. Dunham
His Attorney.

Oct. 22, 1940.  H. O. SCHMIDT  2,219,200
ELECTRIC VALVE CONVERTING SYSTEM
Filed June 7, 1939  4 Sheets-Sheet 4

Inventor:
Hellmuth O. Schmidt,
by Harry E. Dunham
His Attorney.

Patented Oct. 22, 1940

2,219,200

UNITED STATES PATENT OFFICE 2,219,200

ELECTRIC VALVE CONVERTING SYSTEM

Hellmuth O. Schmidt, Berlin, Germany, assignor to General Electric Company, a corporation of New York Application June 7, 1939, Serial No. 277,936
In Germany June 23, 1938

15 Claims. (Cl. 172—281)

My invention relates to electric valve converting systems and it has particular relation to apparatus for changing currents of relatively low frequency into currents of relatively high frequency, especially in connection with inductive heating systems.

Polyphase alternating currents of low frequency have been converted into single phase alternating currents of high frequency by operating at the high frequency a plurality of biphase rectifiers, corresponding in number to the number of phases of the low frequency alternating current circuit, and inductively coupling an output winding to the windings of the biphase rectifiers for supplying the higher frequency current necessary to operate an induction furnace. It is often desirable to be able accurately to control the power supplied to induction furnaces, and where they are used for alloying metals it is essential that regulation of this power be possible. Frequently in alloying the process is carried out according to a time temperature graph and in order that this graph may be followed the power supplied to the furnace must be controllable. The electric energy consumed by an induction furnace is proportional to the square of the voltage supplied to the furnace and hence where an electric valve frequency changer supplies the energy, control of the power supplied may be obtained by regulating the output voltage of the frequency changer. Arrangements have been proposed for regulating the output voltage in frequency changers supplying energy to an induction furnace. For example, it has been suggested to provide taps on the supply transformer so as to control the magnitude of the voltage applied to the frequency changing apparatus but such regulation, which must take place under load, requires tap changing equipment which is not as simple to build and to operate as is desired. It has also been suggested to provide an arrangement wherein variable portions of the supply voltage are used to make up the high frequency output voltage and when increased output voltage is desired, a larger portion of the supply voltage is used and hence the power output is increased. This arrangement has several disadvantages, among them being that some compulsory commutation scheme is necessary, and furthermore only a relatively slight frequency change is possible since the output frequency can only be multiplied by the number of phases in the supply circuit. It would be desirable, therefore, to provide a frequency changing apparatus for supplying an induction furnace wherein regulation of the output voltage may be obtained in a simple and economical manner. Accordingly, I have provided a frequency changing apparatus for supplying an induction heating apparatus wherein complete regulation of the output voltage may be had without any of the disadvantages inherent in known apparatus.

It is an object of my invention to overcome the disadvantages above noted in connection with electric valve converting apparatus for use in connection with frequency changing systems.

It is another object of my invention to provide a new and improved electric valve frequency changer in which complete regulation of the output voltage may be obtained.

Still another object of my invention is to provide an electric valve converting system for supplying the high frequency alternating current necessary to energize an induction heating apparatus and wherein regulation of the power supplied to such heating apparatus is obtained.

It is a further object of my invention to provide an electric valve converting system of the type wherein a plurality of biphase rectifiers are used to convert a low frequency polyphase alternating current into a high frequency single phase alternating current wherein complete control of the power output is possible over a very wide range of operation.

It is another object of my invention to control the power output of an electric valve frequency changing apparatus without in any way disturbing the normal operation of the apparatus.

It is another object of my invention to control the power output of an electric valve frequency changing apparatus by two different means whereby both a fine and coarse regulation may be obtained.

It is another object of my invention to provide a control means for an electric valve frequency changing apparatus wherein the frequency changer may be effectively cut out of the circuit while supplying a load without elaborate and expensive switching means.

In accordance with the illustrated embodiment of my invention I provide an electric valve frequency changing apparatus wherein a three-phase alternating current supply voltage is rectified through a plurality of biphase rectifiers, one for each phase of the alternating current supply, and wherein a high frequency output voltage is obtained from a winding inductively related to the windings of the biphase rectifiers which operate at the high frequency desired at the output. Complete control of the output voltage of the frequency changer is possible by means of auxiliary tubes in the grid circuits of the biphase rectifiers whereby it is possible to control the period of use of each cycle of each phase of the alternating current supply voltage impressed on the biphase rectifiers and thus control the power output to the induction furnace. By changing the frequency of the alternating potentials supplied to the biphase rectifier control electrodes a second means of controlling the output power is provided. Also by simple control means the frequency changer may be cut out of the circuit even while supplying full load.

Figure 2:
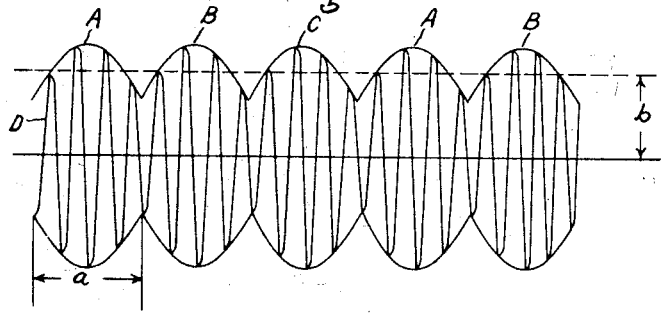
Figure 3:
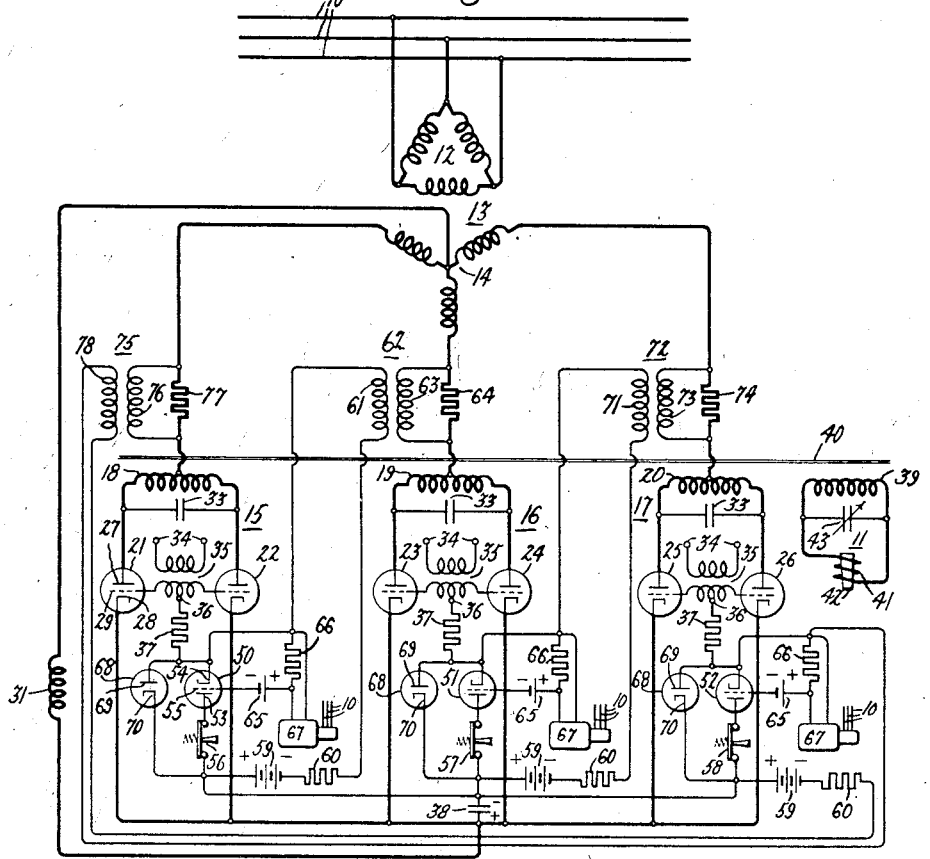
Figure 8:
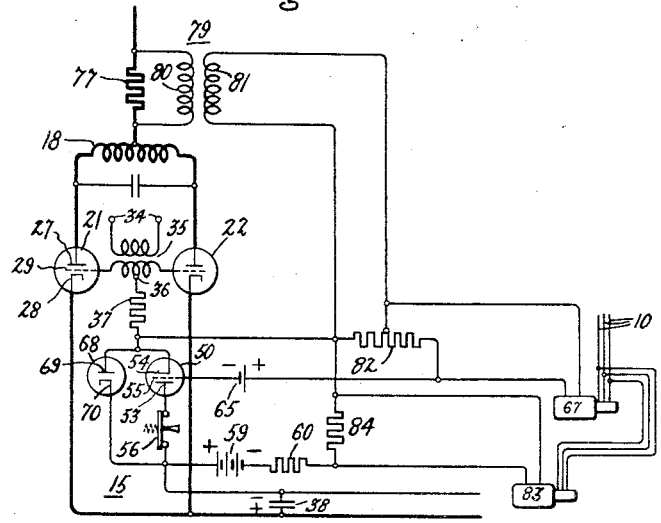
Figure 9:

For a better understanding of my invention reference may be had to the following description taken in connection with the accompanying drawings, and its scope will be pointed out in the appended claims. Fig. 1 of the accompanying drawings diagrammatically illustrates a frequency changer of the type to which my invention is applied and shown symbolically, and Fig. 2 represents certain operating conditions of this frequency changer; Fig. 3 illustrates in more detail an embodiment of my invention applied to the frequency changer illustrated in Fig. 1, and Figs. 4, 5, 6 and 7 represent certain operating conditions of the arrangement shown in Fig. 3; Fig. 8 diagrammatically shows another embodiment of my invention as applied to the frequency changing system illustrated in Fig. 1, and Fig. 9 represents certain operating characteristics of the arrangement shown in Fig. 8.

Referring now to Fig. 1 of the accompanying drawings, I have shown diagrammatically the power circuits of an electric valve frequency changing apparatus with symbolically represented control circuits in accordance with my invention for transmitting energy between a polyphase alternating current circuit 10 and a single phase alternating current load circuit 11 of higher frequency than that of the supply circuit 10. Energy is supplied from alternating current circuit 10 to the primary winding 12 of a three-phase transformer 13 having a Y-connected secondary winding 14. A plurality of biphase rectifiers 15, 16 and 17 are provided which comprise inductive windings 18, 19 and 20, each including a pair of end terminals and midtap. The midtaps of each of the windings 18, 19 and 20 are connected, respectively, to one of the phases of the Y-connected secondary winding 14 of transformer 13. Electric discharge valves 21, 22, 23, 24, 25 and 26 are associated with each of the end terminals of windings 18, 19 and 20. Each of the electric discharge valves is provided with an anode 27, a cathode 28 and a grid or control electrode 29. The electric discharge valves 21, 22, 23, 24, 25 and 26 may be any of the types of electric valves well known to those skilled in the art, although I prefer to use electric valves of the type embodying an ionizable medium such as a gas or a vapor. The cathodes 28 of electric valves 21 to 26 are all connected together and form the positive terminal of direct current circuit 30 which includes a reactor 31 connected to the neutral of the primary winding 14 of supply transformer 13 through a suitable conductor 32. Although I have illustrated electric valves 21 to 26 as of the type each comprising a separate envelope containing an anode, a cathode and a control electrode, it will be understood that these valves may all be combined into a single valve having a single cathode and a plurality of anodes and grids or control electrodes. Commutating capacitors 33 are connected across each of the biphase rectifier windings 18, 19 and 20 in order to supply the commutating voltage necessary to transfer the current from one valve to the other of each of the biphase rectifiers. The control electrodes 29 of electric discharge valves 21 to 26 are supplied with an alternating potential from a high frequency alternating current source indicated by the terminals 34 of a frequency corresponding to that desired at the load circuit 11. This high frequency alternating potential from the terminals 34 is applied to each of the control electrodes 29 through grid transformers 35 having a midtap 36 provided on the secondary winding thereof. The midtaps 36 are connected together through suitable current limiting resistors 37 and a capacitor 38 to the cathodes 28 of the discharge valves 21 to 26. The capacitor 38 is connected to provide a self biasing arrangement for maintaining a negative bias on the control electrodes 29 of each of the electric valves 21 to 26 which are idle during a particular interval of time. Capacitor 38 is charged from the small positive ion current which flows through the grid circuit of the particular electric valve conducting current at any particular instant.

The load circuit for the electric valve frequency changer comprises secondary winding 39 mounted on a common core 40 with each of the windings 18, 19 and 20 of biphase rectifiers 15, 16 and 17. Due to the grid control each biphase rectifier operates at the high frequency desired for the load circuit 11, i. e., current commutates at the output frequency from one tube to the other in the particular biphase rectifier carrying current. A corresponding high frequency voltage will therefore be induced in winding 39. In addition the low frequency alternating current supply voltage will also be induced in winding 39 and there results a voltage which comprises the superimposition of the low and high frequency voltages induced in secondary winding 39. This voltage is supplied to the heating coil 41 of the induction furnace 42 schematically represented in Fig. 1 by a crucible. In order to produce a unity power factor load for the electric valve frequency changing apparatus a variable capacitor 43 is provided across secondary winding 39 which is adjusted from time to time during the operation of the furnace so as to compensate for the variable wattless current demand of the furnace coil 41. Elements 44 to 49 symbolically represent my control circuit illustrated in greater detail in Fig. 3, and described hereinafter.

The operation of the frequency changing apparatus illustrated in Fig. 1 disregarding for the moment the control elements symbolically shown at 44 to 49 may best be understood by reference to Fig. 2 where A, B and C represent the useful portions of the three-phase alternating current voltages applied respectively to the biphase rectifiers 15, 16 and 17. D indicates the high frequency alternating current voltage supplied to the furnace coil 41 which has an amplitude variation corresponding to that of the three-phase supply voltage. When the alternating current potential of the supply circuit 10 is impressed on the biphase rectifiers 15, 16 or 17 the particular one of these rectifiers upon which the highest positive potential is impressed, will begin operation. Assume for example that biphase rectifier 15 begins to operate; then for substantially 120 electrical degrees with reference to the supply voltage, biphase rectifier 15 will transmit the energy from the alternating current supply circuit 10 to the direct current circuit 30 and current will alternately flow first through electric valve 21 and then through electric valve 22, the changes occurring at the frequency of grid potential 34. This alternate conduction of electric valves 21 and 22 at the high frequency results in a current flow in the two halves of winding 18 which causes a high frequency flux change in core 40 and, of course, induces a corresponding high frequency voltage in secondary winding 39. After biphase rectifier 15 has been conducting current for substantially 120 electrical degrees with reference to the supply voltage, the positive potential impressed upon biphase rectifier 16 becomes higher than that impressed on biphase rectifier 15 and hence biphase rectifier 16 begins to conduct the current alternately through discharge valves 23 and 24 at a frequency determined by the frequency of grid potential 34 and current ceases to flow through biphase rectifier 15 after commutation is complete. The useful period of each biphase rectifier during one cycle of supply voltage is represented by $a$ in Fig. 2 while $b$ represents the average amplitude approached by the high frequency output voltage D when inductance 31 in the direct current circuit is large.

Fig. 3 of the accompanying drawings diagrammatically illustrates in greater detail an embodiment of my invention applied to the frequency changer illustrated in Fig. 1 and symbolically shown by elements 44 to 49. The arrangement of the main power circuits illustrated in Fig 3 is substantially the same as shown in Fig. 1 and the same reference numerals are retained for the corresponding parts. As illustrated in Fig. 3, I provide a control circuit for each of the electric discharge valves 21 to 26 of the biphase rectifiers 15, 16 and 17 which is superimposed upon the main control circuit comprising alternating voltage 34, grid transformer 35 and the biasing capacitor 38. In the grid to cathode circuit of the biphase rectifiers 15, 16 and 17 I provide reversely connected auxiliary discharge valves 50, 51 and 52, respectively, each connected in series with grid resistance 37 and comprising an anode 53, a cathode 54 and a control electrode 55. Pushbutton switches 56, 57 and 58 are provided in series with each of the auxiliary discharge valves 50, 51 and 52, respectively, the purpose of which will be hereinafter described. In parallel with electric discharge valve 50 and pushbutton switch 56 I provide a circuit including battery 59, resistance 60 and secondary winding 61 of a potential transformer 62, the primary winding 63 of which is connected across a resistor 64 in the alternating voltage supply line connected to the next succeeding biphase rectifier to become conductive, namely rectifier 16. Battery 59 aids capacitor 38 in impressing a negative bias on the control electrodes 29 of the electric discharge valves 21 and 22 when they are not conducting current. A battery 65 and resistance 66 are included in the grid circuit of control electrode 55 of auxiliary discharge valve 50, the battery 65 normally impressing a negative bias voltage upon the grid 55. A phase shifter 67 energized from alternating current supply circuit 10 impresses a voltage across resistance 66 so as to overcome the negative bias on grid 55 and allow auxiliary discharge valve 50 to become conducting during the time when the supply voltage impressed on winding 18 of biphase rectifier 15 is positive. By means of phase shifter 67 it is possible to retard or advance the excitation of grid 55 of auxiliary discharge valve 50 and thereby retard or advance the interval at which electric discharge valve 50 becomes conductive and hence also the interval when valves 21 and 22 may become conducting, for until auxiliary discharge valve 50 has become conductive a negative bias equal to the voltage of battery 59 plus the voltage on condenser 38 maintains the grids 29 of electric discharge valves 21 and 22 negative and thereby prevents these valves from becoming conductive. When the current commutates from biphase rectifier 15 to biphase rectifier 16 the initiation of a flow of current through resistor 64 will cause an impulse voltage to be induced in the secondary winding 61 of potential transformer 62 which will impress a high negative voltage impulse on the anode 53 of electric discharge valve 50 relative to the cathode 54, overcoming the voltage of battery 59 and thereby forcibly extinguishing the current being conducted by valve 50. A peaked wave shape may be given to the potential obtained from transformer 62 by properly proportioning the time constant of the circuit. I have provided an electric discharge valve 68 having an anode 69 and a cathode 70 connected across electric discharge valve 50, and arranged with anode and cathode positioned in the same direction as electric valves 21 and 22 but reversed with respect to auxiliary valve 50 so as to absorb, by becoming conductive, the high voltage impulses induced by the secondary 61 of potential transformer 62.

A control circuit similar to that just described for biphase rectifier 15 is provided for rectifiers 16 and 17. A potential transformer 72 has its primary winding 73 connected across resistance 74 in the alternating current supply line to rectifier 17 while the secondary winding 71 is connected in the grid control circuit of rectifier 16 across auxiliary electric discharge valve 51 and pushbutton 57. Similarly a potential transformer 75 has is primary winding 76 connected across resistance 77 in the alternating current supply line to rectifier 15 while the secondary winding 78 is connected in the grid control circuit of rectifier 17 across auxiliary electric discharge valve 52 and pushbutton 58. The remaining parts of the control circuits of biphase rectifiers 16 and 17 are characterized by the same reference numerals as the corresponding parts of rectifier 15. By means of the grid control just described for the biphase rectifiers the period of use of these various rectifiers relative to the positive half cycle of the alternating current supply voltage may be increased or decreased so as to control the magnitude of the output voltage and hence the power supplied to the induction furnace load.

Figure 4:
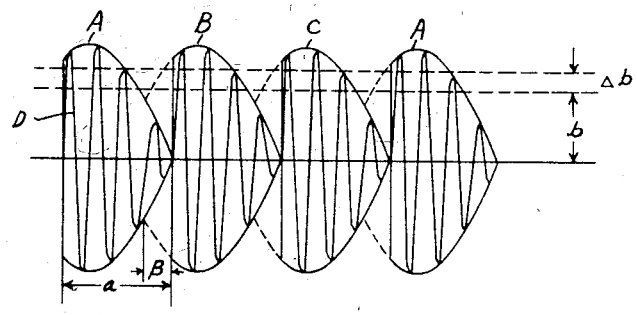

In order to understand the operation of the embodiment of my invention illustrated in Fig. 3, reference may be had to Fig. 4 which is similar to Fig. 2 except that the phase positions of the phase shifters 67 have been changed so as to retard the instant during each cycle that the electric valves 21 to 26 become conducting. This angle of retardation with respect to the fully modulated operation of the biphase rectifiers illustrated in Fig. 2 is shown as $\beta$ in Fig. 4. As in Fig. 2 the period of use of each cycle of each phase of the supply voltage is illustrated by $a$ and the average value $b$ of the output voltage D has been reduced by an amount $\Delta b$ thus reducing the power supplied to the furnace. When the alternating current supply causes the maximum positive potential to be impressed across biphase rectifier 15 this rectifier is conducting current and rectifiers 16 and 17 are idle. High frequency alternating potential 34 is impressed upon the grids 29 of electric discharge valves 21 and 22. However, unless auxiliary electric discharge valve 50 is conductive and push button switch 56 is closed, high frequency grid potential 34 is ineffective since the grid to cathode circuit is not complete. Since the grid 55 of auxiliary discharge valve 50 is supplied with an alternating potential of the same frequency as the supply potential 10, auxiliary discharge valve 50 may be made conductive during substantially 120 electrical degrees with reference to the supply voltage or during the maximum time that biphase rectifier 15 may conduct current. However, by means of phase shifter 67, as is well understood by those skilled in the art, the control electrode 55 of electric valve 50 may be maintained negative at the voltage of battery 65 for some time after biphase rectifier 15 would ordinarily become conducting if the arrangement disclosed in Fig. 1 exclusive of control members 44 to 49 were present. Hence, by controlling the position of phase shifter 67 the time at which electric discharge valve 50 becomes conducting may be controlled and since electric discharge valves 21 and 22 are maintained non-conductive as long as the negative potential of battery 59 and condenser 38 are impressed upon electrodes 29, biphase rectifier 15 cannot conduct current until battery 59 is shunted by the current discharge in valve 50. When the current commutates from biphase rectifier 15 to biphase rectifier 16 the initiation of the current flow through resistor 64 causes a voltage impulse to be induced in the secondary winding 61 of potential transformer 62 and this voltage impulse is of such magnitude as to overcome the battery voltage 59 and extinguish the current discharge through electric valve 50 by impressing a high negative potential on the anode 53 relative to the cathode 54 of electric discharge valve 50. Auxiliary discharge valve 68 by becoming conductive prevents the high voltage impulse produced by potential transformer 62 from reaching dangerously high values. Since the discharge across auxiliary valve 50 has been extinguished the negative bias of battery 59 and conductor 38 is again impressed on the grids 29 of the electric discharge valves 21 and 22, thus enabling the grids 29 of these valves to again obtain control whereby the current is commutated to biphase rectifier 16. The same process is repeated for the operation of biphase rectifier 16 when the current is commutated to biphase rectifier 17. It is, therefore, possible by adjusting phase shifters 67 of biphase rectifiers 15, 16 and 17 to obtain an output voltage similar to that illustrated in Fig. 2 when maximum power output is obtained. f the phase shifters 67 are positioned so that electric discharge valve 50 is prevented from becoming conductive for an angle $\beta$ as illustrated in Fig. 4, the reduced output voltage illustrated in Fig. 4 will be obtained. It will be understood by those skilled in the art that any desired output voltage may therefore be obtained by this arrangement and no interference with the high frequency control means of the biphase rectifiers will occur.

An additional regulation of the output voltage of the frequency changer may be obtained by varying the frequency of grid potential source 34. A change in frequency of the alternating potential impressed across the parallel connected load coil 41 and capacitor 43 will cause a change in the power taken by the load by virtue of resultant impedance change. By this arrangement the control frequency may be changed in fairly large steps giving power output control in fairly large steps. A fine control may therefore be obtained for each step by properly positioning the phase shifters 67. The combination of varying the frequency of the grid potential and also varying the useful portion of the supply voltage results in a control of the power output to the induction furnace over a very wide range.

Pushbutton switches 56, 57, and 58 will serve to break the current flow through auxiliary electric discharge valves 50, 51 and 52, respectively, and since this current is normally very small, the electric valve frequency changer may be made inoperative at any time by merely opening pushbutton switches 56, 57 and 58, at which time the negative bias of battery 59 is impressed on all the control electrodes 29 of electric discharge valves 21 to 26. When this electric valve frequency changer is used to supply an electric furnace this simple means of disconnecting the frequency changer is very desirable if it is necessary to vary capacitance 43 to compensate for the variable wattless current demand of the furnace coil 41. No expensive switches for breaking the main power circuit are necessary and yet by opening pushbutton switches 56 to 58 the furnace coil is entirely deenergized.

Figure 5:
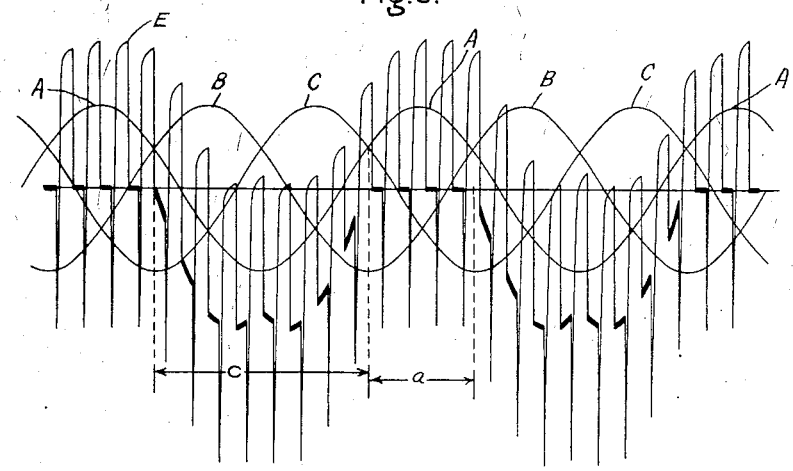

Fig. 5 shows the anode voltage E as it would appear across electric discharge valve 21 of biphase rectifier 15 when the frequency changer is supplying the maximum power corresponding to the condition illustrated by Fig. 2. The three phase alternating current supply voltages A, B and C are also shown. The positive half cycle of supply voltage A is the useful period as far as the operation of the biphase rectifier 15 is concerned and this period is indicated by $a$ in Fig. 5. Observing the anode voltage E, namely the voltage across discharge valve 21, it is seen that the conducting period is indicated by the heavy horizontal line of almost zero voltage which is immediately followed by the negative deionization peak or commutating voltage obtained from condenser 33. Then follows the rise of the anode voltage during the succeeding half cycle with reference to the high frequency output circuit during which time electric discharge valve 22 is conducting current and then the next succeeding discharge period 180 degrees later when discharge valve 21 again begins to conduct current. As soon as the alternating current supply potential B of the next succeeding phase becomes greater than the positive potential A, biphase rectifier 16 begins to conduct current. Because of the inductive relation of windings 18, 19 and 20 the anode voltage E across electric discharge valve 21 is a high frequency alternating potential superimposed upon the alternating current low frequency supply potential impressed on biphase rectifier 15 as shown during the period $c$ in Fig. 5. Also during the range $c$ when biphase rectifier 15 is idle it is observed that the anode voltage of valve 21 becomes positive at times. If the grid 29 also became positive then valve 21 would conduct during the time when it should be idle. However, condenser 38 functions so as to prevent this from occurring.

Figure 7:
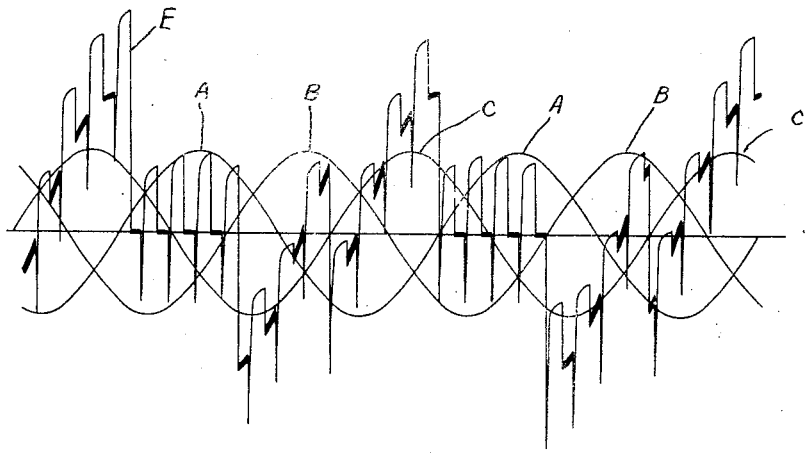

Fig. 7 shows the anode voltage E as it would appear across electric discharge valve 21 of biphase rectifier 15 when the phase shifters 67 have been adjusted so that a retardation of the grid control of electric discharge valve 50 amounting to an angle β has been obtained similar to the operating conditions shown in Fig. 4. Except for the positioning of the phase shifters the same operating conditions illlustrated by Fig. 5 are also illustrated in Fig. 7. The anode voltage E during the useful period when biphase rectifier 15 is conducting is considerably decreased in Fig. 7 as compared with Fig. 5.

Figure 6:

Fig. 6 is an oscillogram representing the various current and voltage conditions in the embodiment of my invention illustrated in Fig. 3 when the operating conditions represented by Figs. 4 and 7 occur. $I_1$ illustrates the impulse current flowing in the secondary winding 78 of potential transformer 75 for extinguishing the discharge current through auxiliary discharge valve 52 of biphase rectifier 17 to commutate the current from rectifier 17 to rectifier 15. $I_2$ represents the positive ion current flowing through the grid circuit of electric discharge valves 21 and 22. F represents the potential across electric valve 50, while G represents the grid potential of auxiliary discharge valve 50 and contains the negative bias potential of battery 65 and the voltage delivered by the phase shifter 67 across resistor 66. E indicates the potential across discharge valve 21 and is identical with the voltage E shown in Fig. 7. D represents the high frequency output voltage supplied to the furnace. It is observed that the current $I_1$ dies away to zero in a short time based on the low time constant of the circuit containing the secondary 78 of grid transformer 75.

In the arrangement just described the magnitude of the negative voltage impulse derived from potential transformers 62, 72 or 75 is dependent upon the load current conducted by the respective biphase rectifiers. Sometimes it is not desirable that this impulse voltage should vary with load and for obviating this difficulty I provide an arrangement wherein this voltage impulse can be obtained directly from a saturated transformer which delivers a large negative peaked voltage across the auxiliary discharge path 50 and extinguishes the current flowing therein to commutate the current to the next biphase rectifier to operate. In Fig. 8 I have shown a portion of the frequency changer which is a modification of the embodiment of my invention diagrammatically illustrated in Fig. 3. The same reference numerals have been retained for corresponding parts. Biphase rectifier 15 is illustrated as supplied with energy from the three phase source through resistor 77, just as shown in Fig. 3. However, a potential transformer 79 has its primary winding 80 connected across resistance 77 and its secondary winding 81 connected across the grid-to-cathode circuit of auxiliary discharge valve 50 so as to supply a positive voltage overcoming the negative bias of battery 65 during the entire period that the biphase rectifier 15 is conducting. The time constant of this circuit should be as large as possible so that a substantially rectangular voltage may be applied to the grid of electric discharge valve 50. Phase shifter 67 as in Fig. 3 controls the ignition point of auxiliary electric discharge valve 50 by impressing a potential across resistor 82 which is conneeted across the grid circuit of auxiliary discharge valve 50. A saturated transformer 83 supplies the voltage impulse necessary for extinguishing discharge valve 50 at the end of its conducting period. This impulse is impressed across resistor 84.

The operation of the arrangement disclosed in Fig. 8 is very similar to the operation of the arrangement shown in Fig. 3 and will be readily understood by those skilled in the art. The oscillogram illustrated in Fig. 9 represents the same operating conditions of Fig. 8 as are represented by Fig. 6 relative to Fig. 3. In this case $I_1$ has a high positive value for substantially the entire conducting period of the biphase rectifier 15 so as to retain the grid 55 positive and thus maintain electric discharge valve 50 conducting. The current $I_2$ through grid resistor 37 is substantially the same. However, the voltage F across electric discharge valve 50 contains a positive peak. The grid potential G on control electrode 55 of auxiliary discharge valve 50 is changed only slightly from that illustrated in Fig. 6. The voltage E across discharge valve 21 and the high frequency output voltage D are the same as illustrated in Fig. 6.

While I have shown and described particular embodiments of my invention as applied to electric valve frequency changing apparatus, it is to be understood that these are merely illustrative of a number of electric valve converting or translating apparatus to which my invention may be applied. It will, of course, be obvious to those skilled in the art, that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In an electric valve frequency changing system comprising an alternating current supply circuit, an alternating current load circuit operating at a frequency higher than that of said supply circuit, transformer means interconnecting said load and supply circuits and comprising a secondary winding connected to said load circuit and a plurality of primary windings each having a plurality of end terminals and a midtap said midtaps being connected to said supply circuit, a plurality of electric valves associated with said end terminals of said primary windings, a direct current circuit interconnecting said electric valves and said supply circuit, and control means for said electric valves including an auxiliary valve for varying the power supplied to said load circuit.

2. In an electric valve frequency changing system, a three-phase alternating current supply circuit, a direct current circuit, a biphase rectifier for each phase of said supply circuit connecting said supply circuit with said direct current circuit and comprising an inductive winding and a pair of discharge valves provided with an anode, a cathode and a control electrode, an alternating current load circuit having a frequency higher than that of said supply circuit and including a winding inductively associated with each of said inductive windings of said biphase rectifiers, and means including an auxiliary valve connected to the control electrodes of said discharge valves for varying the power supplied to said load circuit.

3. In an electric valve frequency changing system, a polyphase alternating current supply, means for converting said alternating current supply into single phase alternating current of a frequency higher than supply circuit comprising a plurality of biphase rectifiers each including a plurality of main discharge valves and a control system therefor, said control system including an auxiliary valve, means for rendering said auxiliary valve conductive at varied instants during a cycle of the alternating current supply for varying the power output of said frequency changing system, and means including a potential transformer for extinguishing the electric discharge in said auxiliary valve to aid commutation from one biphase rectifier to the other.

4. In an electric valve frequency changing system, a polyphase alternating current supply voltage, means for converting said supply voltage into alternating current voltage of a higher frequency than that of said supply voltage, including a main electric discharge valve provided with a control circuit, and means for controlling the power output of said electric valve frequency changer comprising an auxiliary valve connected in the control circuit of said main valve for controlling the time when said main valve becomes conductive, means for varying the instants during a cycle of the alternating current supply voltage that said main valve becomes conductive, and voltage impulse producing means for extinguishing the current discharge in said auxiliary valve whereby control of the electric discharge in said main valve may again be obtained.

5. In an electric valve frequency changing system, an alternating current supply voltage, means for converting said supply voltage into an alternating current voltage of a higher frequency than that of said supply voltage including a plurality of biphase rectifiers each provided with a pair of main electric discharge valves, a control circuit for said electric discharge valves including an auxiliary valve, means for controlling the power output of said frequency changing system by controlling the operation of said auxiliary valve, and means dependent upon the initiation of current in a second biphase rectifier for extinguishing the discharge current flowing through said auxiliary valve, and switching means in series with said auxiliary valve for causing said frequency changing system to become inoperative.

6. In an electric valve frequency changer, a polyphase alternating current supply circuit, an alternating current load circuit, means including a plurality of inductive windings each having a plurality of electric discharge valves associated therewith for transmitting current from said supply circuit to said load circuit at a higher frequency than the frequency of said supply circuit, each of said inductive windings being energized from a different phase of said supply circuit and having end terminals connected to corresponding elements of the electric discharge valves associated therewith, and control means for controlling the portion of the low frequency supply voltage wave during which the valves associated with each of said inductive windings are conductive to vary the voltage of said high frequency load circuit.

7. Control means for an electric valve frequency changer of the type including a plurality of main electric discharge valves provided with control circuits for controlling the power output of said frequency changer including a source of control potential tending to render said main valves nonconductive, an auxiliary valve shunting said source of control potential, means for periodically rendering said valve conductive to remove the effect of said control potential on said main discharge valves, and switching means in series with said auxiliary valve to prevent said auxiliary valve from becoming conductive.

8. In combination, a low frequency alternating current supply circuit, an electric valve frequency changer comprising a plurality of biphase rectifiers operating one after the other in timed sequence for converting the low frequency alternating current from said supply circuit into a higher frequency alternating current, and means for varying the power output of said frequency changer comprising a control circuit for maintaining said biphase rectifiers inoperative during different portions of a cycle of said low frequency alternating current supply.

9. In combination, a low frequency alternating current supply circuit, an electric valve frequency changer comprising a plurality of biphase rectifiers operating one after another in timed sequence for converting the low frequency alternating current from said supply circuit into a higher frequency alternating current, a control circuit for controlling the conductivities of the valves of said frequency changer to vary the power output thereof including a source of variable frequency control potential for determining the frequency of said alternating current load circuit and means for determining the portion of the alternating current voltage wave of said low frequency supply during which the valves of each of said biphase rectifiers are transmitting current at the frequency of said load circuit.

10. In an electric valve frequency changing system, an alternating current supply voltage, means for converting said supply voltage into an alternating current voltage of a higher frequency than that of said supply voltage including a plurality of biphase rectifiers each provided with a pair of main electric discharge valves and an auxiliary valve for controlling the power output of said frequency changing system, means for varying the instant during a cycle of the supply voltage that said auxiliary valve is rendered conductive, and means including a potential transformer for maintaining said auxiliary valve conductive during the entire time that its associated biphase rectifier is operating.

11. In an electric valve frequency changing system, an alternating current supply voltage, means for converting said supply voltage into an alternating current voltage of a higher frequency than that of said supply voltage including a plurality of biphase rectifiers each provided with a pair of main electric discharge valves and a control circuit for said valves including an auxiliary valve for controlling the power output of said frequency changing system, controllable means for rendering said auxiliary valve conductive at different instants during a cycle of the supply voltage for initiating the operation of the associated biphase rectifier, means for maintaining said auxiliary valve conductive during the entire period that its associated biphase rectifier is to operate, and means for extinguishing the discharge in said auxiliary valve at the instant that its associated biphase rectifier is to become inoperative.

12. In an electric valve frequency changing system, a polyphase alternating current supply voltage, means for converting said alternating current supply voltage into a single phase alternating current voltage of a higher frequency comprising a plurality of biphase rectifiers each including a plurality of main discharge valves and a control system therefor, said control system including a pair of reversely connected auxiliary valves, control means for rendering one of said auxiliary valves conductive at various instants during a cycle of the alternating current supply voltage for varying the power output of said frequency changing system, means for impressing an impulse voltage across said controlled auxiliary electric discharge valve to extinguish the electric discharge therethrough at the end of its conducting period, and means including said second auxiliary valve for preventing said voltage impulse from injuring said electric valve frequency changing system.

13. In an electric valve frequency changing system, an alternating current supply voltage, means for converting said voltage into an alternating current voltage of a higher frequency than that of said supply voltage including a plurality of inductive windings each having a plurality of main electric discharge valves associated therewith, a control circuit for controlling the conductivities of the electric discharge valves associated with each of said inductive windings including an auxiliary valve, and means for commutating current from one of said inductive windings to a second one of said inductive windings including means responsive to the initiation of current in the valves associated with said second inductive winding for extinguishing the current flowing through the auxiliary valve associated with said one inductive winding.

14. In an electric valve frequency changing system, an alternating current supply voltage, means for converting said supply voltage into an alternating current voltage of a higher frequency including a plurality of inductive windings each having a pair of main electric discharge valves including a control electrode associated therewith, said load circuit including an inductive winding inductively coupled to said first named inductive windings, a control circuit associated with the control electrodes of said valves including a source of high frequency alternating control potential tending to render said electric discharge valves alternately conductive and non-conductive at said high frequency, and means for deriving a potential having the frequency of said supply voltage and variable in phase with respect thereto for determining the portion of the voltage wave of said supply during which said high frequency control potential is effective to control the conductivities of the valves associated with each of said first named inductive windings to vary the output of said frequency changing system.

15. In an electric valve frequency changing system, an alternating current supply circuit, means including a plurality of inductive windings having a plurality of electric discharge valves including a control electrode associated therewith for transmitting current from said supply to said load circuit at a higher frequency than the frequency of said supply, each of said inductive windings having end terminals connected to corresponding elements of the electric discharge valve associated therewith, a control circuit associated with the control electrodes of said valves including a source of high frequency alternating current tending to render said electric discharge valves alternately conductive and nonconductive at said high frequency, means for controlling the portion of the voltage wave of said alternating current supply during which the valves associated with each of said inductive windings is conducting including an auxiliary discharge valve, and means for rendering said auxiliary valve conductive at variable times in the alternating current supply voltage wave to determine the portion of the supply voltage wave during which the main valves associated with each of said inductive windings are rendered conductive and nonconductive by said high frequency control potential.

HELLMUTH O. SCHMIDT.

CERTIFICATE OF CORRECTION.

Patent No. 2,219,200. October 22, 1940.

HELLMUTH O. SCHMIDT.

It is hereby certified that error appears in the printed specification of the above numbered patent requiring correction as follows: Page 2, first column, line 48, before the word "midtap" insert --a--; page 3, second column, line 42, for "is" read --its--; page 4, first column, line 59, for "f" before "the" read --If--; page 7, first column, line 15-16, claim 13, for "pluality" read --plurality--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.